United States Patent [19]
Wise et al.

[11] Patent Number: 5,486,078
[45] Date of Patent: Jan. 23, 1996

[54] REUSABLE VOID FILLER AND CONSTRUCTION METHOD THEREFORE

[75] Inventors: Frederick M. Wise, Arvada; Carl F. DeWitt, Westminster, both of Colo.

[73] Assignee: Capitol Packaging Corporation, Denver, Colo.

[21] Appl. No.: 52,563

[22] Filed: Apr. 23, 1993

[51] Int. Cl.⁶ ............................ B61D 45/00; B63B 25/24
[52] U.S. Cl. ............................ 410/155; 410/154; 206/593
[58] Field of Search .................................. 410/154, 155, 410/121, 122; 428/12, 116; 206/593; 108/53.1; 52/381, 577, 731.1, 731.2, 731.6

[56] References Cited

U.S. PATENT DOCUMENTS

| | | | |
|---|---|---|---|
| 2,957,668 | 10/1960 | Norquist et al. | 108/51.3 |
| 2,980,573 | 4/1961 | Clifford | 410/154 X |
| 3,079,876 | 3/1963 | Doane . | |
| 3,079,877 | 3/1963 | Doane . | |
| 3,405,659 | 10/1968 | Hees | 410/154 |
| 4,386,881 | 6/1983 | Liebel | 410/154 |
| 4,494,897 | 1/1985 | Rogers | 410/154 |
| 4,865,889 | 9/1989 | Boyse | 410/154 X |
| 5,102,272 | 4/1992 | Woods et al. | 410/154 |
| 5,181,814 | 1/1993 | Woods et al. | 410/154 |
| 5,306,100 | 4/1994 | Higginbotham | 410/154 |

*Primary Examiner*—Michael S. Huppert
*Assistant Examiner*—Stephen Gordon
*Attorney, Agent, or Firm*—Timothy J. Martin; Carl Schaukowitch

[57] ABSTRACT

A collapsible void filler is provided which, when in an expanded state, prevents relative movement between cargo during transit. The void filler is formed as a pair of side panels, a pair of bases secured to the side panels, and at least one beam structure located in the interior defined by the side panels and the two bases. The side panels include side panel portions which fold about a longitudinal axis when the void filler is collapsed. The bases, which may be formed from one or more base panels, extend transversely between the side panels and move toward and way from one another when the void filler is collapsed and expanded. The beam structures may have several different configurations, each of which has a pair of beam panels hingedly connected to the bases and foldable with respect to one another. The beam structures operate to support the side panels against transverse compression when the void filler is expanded. The void filler is preferably made from a unitary piece of material.

21 Claims, 7 Drawing Sheets

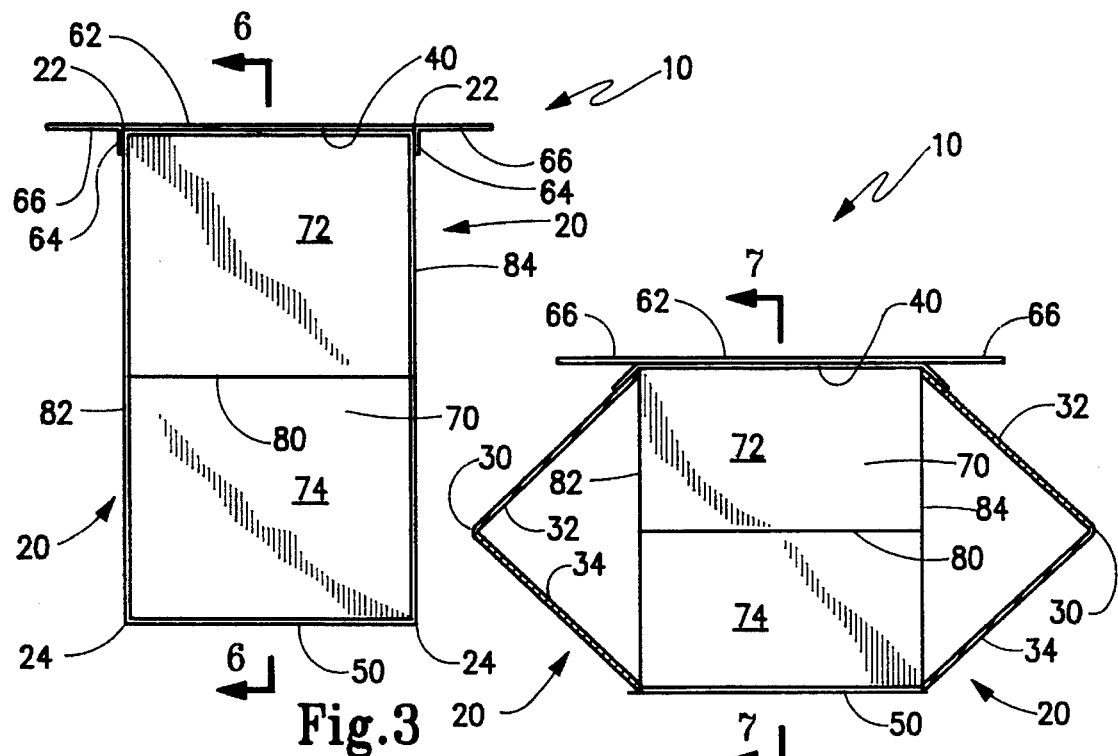
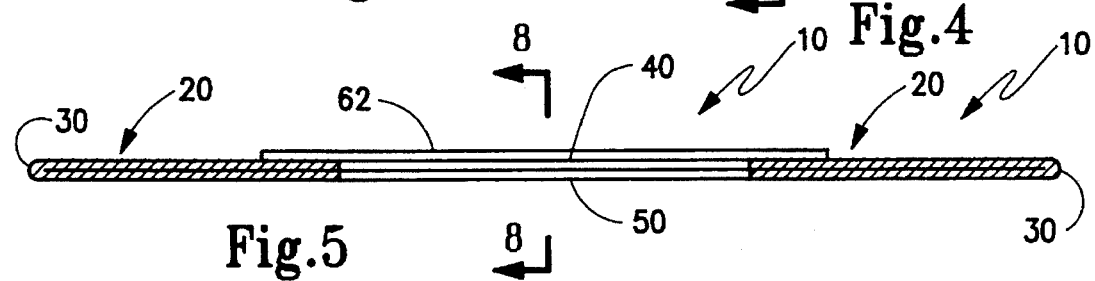
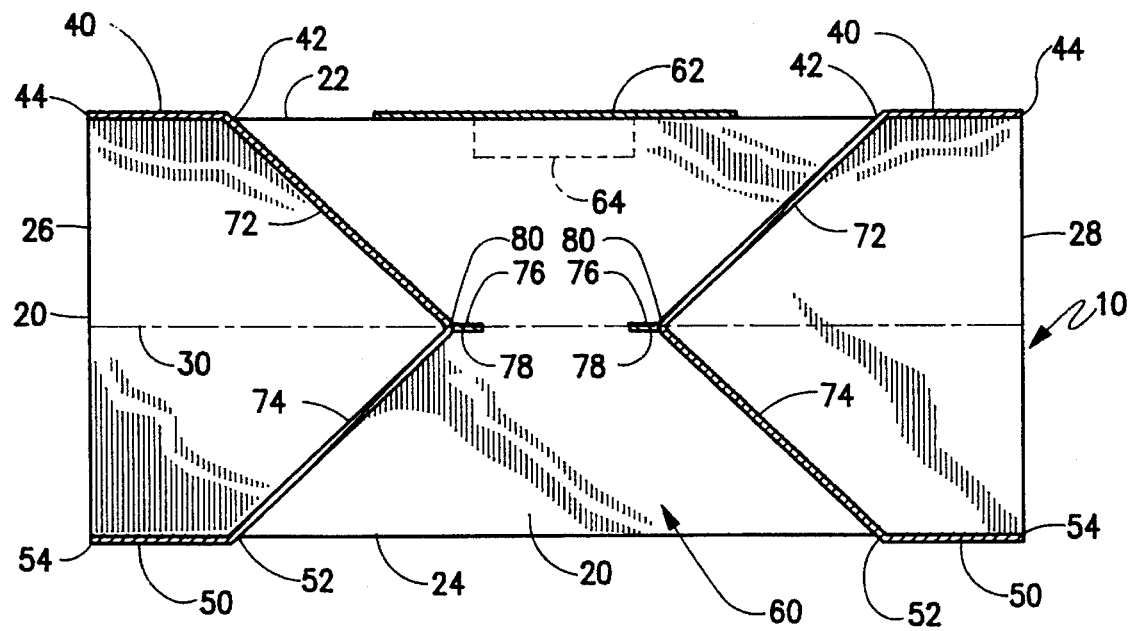

REUSABLE VOID FILLER AND CONSTRUCTION METHOD THEREFORE

FIELD OF THE INVENTION

The present invention generally relates to structures employed to prevent cargo, such as large objects, palletized products, etc., from shifting during transit. Such structures are provided as void fillers placed in open regions between the cargo or between the cargo and the sidewalls of the transport container to prevent shifting of the cargo as it is transported in the container. More specifically, the present invention relates to the field of expandable/collapsible void fillers which may be collapsed into a relatively compact size yet expanded to occupy and greater volume between cargo.

BACKGROUND OF THE INVENTION

Industrialized countries rely upon efficient distribution systems for both raw materials and finished goods. Large objects and bulk commodities are typically transported by standard sized shipping containers, railway cars, tractor/trailers, and the like. It is important to the safety of the cargo as well as the transport container that the stowed cargo be stabilized for shipment. Where cargo is allowed to shift during transport, the cargo can naturally become damaged due to collisions between the cargo itself or between the cargo and the sidewalls of the shipping container. Perhaps more importantly, however, the shifting of the cargo, especially side shifting cargo, can unbalance the container or change the center of mass of the container. Where the shipping container is a vehicle, such as a railway car or tractor/trailer, shifting of the cargo can create a dangerous situation and sometimes cause the vehicle to tip over.

Accordingly, it has long been the custom to stow cargo in a container as carefully as possible and in a manner that substantially eliminates void spaces thereby minimizing the possibility of cargo shifts. In many circumstances, however, the nature of the cargo does not lend itself to such careful packing or it is inefficient from a labor or weight standpoint to completely pack a container with cargo. This is especially true where the cargo comprises large objects or palletized commodities. Therefore, in order to fill the open regions between cargo, it is desirable to provide some sort of dunnage or load spacing device between the cargo and the sidewalls of the container. These dunnage devices or void fillers should be constructed to withstand loading shifting forces typically encountered during cargo transport but also be relatively light weight so as to not unduly increase the shipping load. Furthermore, it is preferable that the void fillers be expandable for use yet be collapsible into a smaller dimension either for shipment to the user or for storage.

One example of such a void filler is described in U.S. Pat. No. 4,494,897 issued 22 Jan. 1985 to Rogers discloses a void filler manufactured of corrugated cardboard as a "tube within a tube" construction. Here, an outer housing is formed as a four-sided tubular member that has open ends and a longitudinal axis extending therethrough. The sides of the outer housing are centrally creased to allow the sides to outwardly bow so that the housing may collapse into a flat configuration. An inner tubular core is disposed within the outer housing in the form of a single cell honeycomb structure that has an axis oriented perpendicularly to the axis of the outer housing. This inner core may likewise expand and collapse, and it is secured to the top and bottom of the housing so that the outer housing and the inner core expand and collapse as a unit. The inner core thus resists compressive forces between the sides of the outer housing when in the expanded configuration.

A somewhat similar structure is shown in U.S. Pat. No. 4,865,889 issued 12 Sep. 1989 to Boyse. In this patent, a plurality of honeycomb cells are organized in a plurality of columns between a pair of outer sheets. Side or deck sheets flank opposite open ends of the honeycomb array and are secured to the outer sheets by flange portions. The deck sheets include fold lines to allow the deck sheets to collapse along with the honeycomb array.

Other prior patents describe void fillers, or pallets which ma be employed as void fillers, having a honeycomb construction. For example, U.S. Pat. No. 3,405,659 issued 15 Oct. 1968 to Hees shows a honeycomb array that is mounted between stiffer tab sheets. The Hees structure is similar to that described in the Boyse patent except that the honeycomb array is formed by joined rows and columns of honeycomb cells and the deck sheets are eliminated. U.S. Pat. No. 4,386,881 issued 7 Jun. 1983 to Liebel is similar to Hees but provides an improved suspension structure for the honeycomb array. U.S. Pat. Nos. 3,079,876 and 3,079,877, each issued 5 Mar. 1963 to Doane show pallet constructions using a honeycomb inner core structure between folding deck panels, and these pallet constructions can be used, if desired, as void fillers.

Although the above void fillers are believed suitable for use in spacing cargo for shipment, they are generally more complex manufacture or construction. Accordingly, there remains a need for improved void fillers that are simpler to produce yet which retain all of the advantages of a light weight device of sufficient strength to be used to space cargo during transport. Therefore, there is a need for improved methods of manufacture of void fillers in order to reduce the costs thereof.

SUMMARY OF THE INVENTION

It is an object of the present invention to provide a new and useful void filler, and construction method therefore, that is inexpensive and cost efficient to use.

Another object of the present is to provide a void filler of relatively compact dimension when collapsed yet which may expand to a substantially larger dimension for use.

A further object of the present invention is to provide an expandable/collapsible void filler having a high strength-to-weight ratio to resist compressive forces when expanded and placed between cargo during shipment.

Yet another object of the present invention is to provide a void filling device that may be suspended between adjacent cargo loads and supported by the respective upper surfaces of the loads.

Still a further object of the present invention is to provide a void filling device of unitary construction.

It is yet another object of the present invention to provide a method for manufacturing a void filling device that is simplified and efficient so that such devices may be produced quickly and at a relatively reduced costs.

According to the present invention, then, a void filling device is provided that is collapsible into a flattened state and expandable into an erect state so that it can be interposed between spaced cargo to inhibit relative movement during transit. The void filling device broadly includes a pair of foldable side panels, at least two base panels extending between the side panels along opposite side edges of the side panels, and a foldable beam structure secured between the base panels and oriented between the side panels. Accordingly, as the void filling device collapses and expands, the side panels and the foldable beam structure concurrently folds and unfolds. It is preferred that the void filling device be formed of a unitary piece of material, such as corrugated cardboard.

More particularly, the side panels are constructed to each have longitudinal extending first and second side edges, and the side panels are spaced apart from one another to define an interior for the void filling device when in the erect state. Each of the side panels includes side panel portions constructed to fold about a longitudinal axis between a folded state when the void filling device is collapsed and an unfolded state when the void filling device is erect. Preferably, the side panels are oriented substantially parallel to one another when the void filling device is in the erect state. Furthermore, it is preferred that the side panels are bi-fold panels which fold symmetrically about the each respective longitudinal axis.

The base panels which extend between the side edges of the side panels include a first base panel hingedly secured to the first side edges of the side panels and a second base panel hingedly secured to the second side edges of the side panels. Preferably, the first and second base panels are in opposed relation to one another so that the first and second base panels move toward one another when the side panel portions are folded and move away from one another when the side panels are unfolded. Thus, the opposed ones of the base panels are closely spaced with respect to one another when the void filling device is collapsed.

The foldable beam structure is hingedly connected to the first and second base panels to extend therebetween and is oriented transversely in the interior between the side panels. The beam structure includes first and second beam panels which are foldable with respect to one another about a transverse axis so that as the first and second base panels move toward and away from one another the first and second beam panels fold to allow the void filling device to collapse and expand. The beam structure is operative, when the void filling is in the erect state, to support the side panels against transverse compression forces. Preferably, the beam structure is also of bi-fold construction. Furthermore, it is preferred that the first and second beam panels are oriented at an angle of less than 180° with respect to one another when the void filling device is in the erect state.

In one exemplary embodiment, a single set of first and second base panels are employed and have parallel first and second transverse edges. The beam structure is then respectively connected to the first and second base panels along a selected one of the first and second transverse edges. Here, the first and second base panels do not extend completely along the side edges of the side panel for the entire length of the void filling device.

In another exemplary embodiment, the first and second base panels extend the entire length of the side panels so that the void filling device is in the form of an uninterrupted rectangular tube formed by the side panels and the base panels. Here, a pair of beam structures is provided and extend between transverse edges of the opposed base panels at opposite ends of the void filling device. Thus, the beam structures project into the interior of the void filling device with each of the first and second beam panels of each beam structure converging to a vertex in the interior of the void filling device.

In another exemplary embodiment, a pair of first base panels are hingedly connected to the first side edges of the side panels and extend transversely therebetween and are spaced-apart from one another to be located proximately to the opposite ends of the void filling device. Likewise, a pair of second base panels are provided, and each are hingedly connected to the second side edges of the side panels to extend transversely therebetween. The second base panels are also spaced-apart from one another to be located at opposite ends of the void filling device such that each of the second base panels is in an opposed relation to a respective one of the first base panels. A pair of beam structures is provided so that a first beam structure is associated with the first and second base panels at a first end of the void filling device and a second beam structure is associated with first and second base panels at a second end of the void filling device. Here, again, the beam structures each have beam panels oriented at an angle of less than 180° with respect to one another when the void filling device is in the erect state and the beam panels of each respective beam structure converge in a direction toward the interior of the void filling device to form a vertex located in the interior. Furthermore, each of the first and second base panels has parallel inner and outer transverse edges, and it is preferred that the beam structures are connected between vertex respective opposed ones of the first and second base panels at the inner transverse edges thereof. Alternatively, the beam structures could be connected between the outer transverse edges of the respective base panels.

An optional hanger panel may be provided with any of these embodiments. The hanger panel is oriented transversely with respect to the side panels along one of the selected first and second side edges thereof. Thus, the hanger panel is in parallel relationship to the base panels and extends outwardly projecting wing portions which may rest upon surfaces of the cargo so that the void filling device may be supported on the cargo surfaces in suspended relationship in the region between the cargo. In addition, two or more of the void filling devices may be affixed to one another, such as in a stacked configuration, to produce a void filler of increased dimension.

According to the broad method of the present invention, a method of forming a void filling device is provided to create a void filling device that has a pair of parallel folding side panels, at least two base panels extending between the side panels in opposed relation to one another, and at least two beam panels attached to one another to form a beam structure to be located interiorly between the two side panels. First, the method includes providing a unitary sheet of construction material having parallel side edges spaced-apart from another to define a width for said sheet. Next, the sheet is scored along a plurality of spaced-apart longitudinal scorelines parallel to the side edges in order to create a pair of folding side panels. The sheet is scored along transverse scorelines perpendicularly between selected ones of said longitudinal scorelines to create the base panels. The beam panels are formed, and the sheet is folded along selected ones of said scorelines whereby each are of the beam panels opposes another beam panel. The method then includes the step of securing the side edges together and portions of the beam panels together whereby the side panels oppose one another and the base panels oppose one another to form said beam structure interiorly of the side panels.

The method may further include steps of providing a construction sheet of such configuration that the beam panels are formed as longitudinal extensions of the base panels. The step of forming the beam panels is then accomplished by scoring the sheet along the transverse scorelines. Alternatively, a step of forming a beam panels may include the step of cutting the beam panels out of the sheet by cutting said sheet along parallel cut lines that are linear extensions of selected ones of the scorelines. Furthermore, at least two beam structures may be formed by cutting the sheet perpendicularly of the parallel cut lines, described above, along a pair of transverse cut lines so that H-shaped cuts are formed in the sheet. In any event, the scorelines and cut lines may be formed contemporaneously. It is contemplated by this method that the construction sheet be formed of corrugated cardboard having corrugations that run perpendicularly to the side edges.

These and other objects of the present invention will become more readily appreciated and understood from a consideration of the following detailed description of the preferred embodiment when taken together with the accompanying drawings, in which:

BRIEF DESCRIPTION OF THE DRAWINGS

FIG. 3 is a cross-sectional view taken about lines 3—3 of FIG. 2 and shows the void filling device in an erect state;

FIG. 4 is a transverse cross-sectional view, similar to FIG. 3, but showing the void filling device in an intermediate state;

FIG. 5 is a transverse cross-sectional view, similar to FIGS. 3 and 4, but showing the void filling device of FIG. 2 in a collapsed state;

FIG. 6 is a longitudinal cross-sectional view taken about lines 6—6 of FIG. 3 showing the void filling device of FIG. 2 in an erect state;

DETAILED DESCRIPTION OF THE EXEMPLARY EMBODIMENTS

The present invention relates to structures or devices which may be used to occupy the region between cargo loads and a container used for shipment of the cargo. These devices, which are commonly referred to as void fillers or void filling devices, are desired to be light weight in manufacturer but of sufficient strength to reduce shifting of the cargo during transit. The present invention includes several embodiments of such a void filling device as well as a method of producing such void filling devices in an efficient manner.

Figure 1:
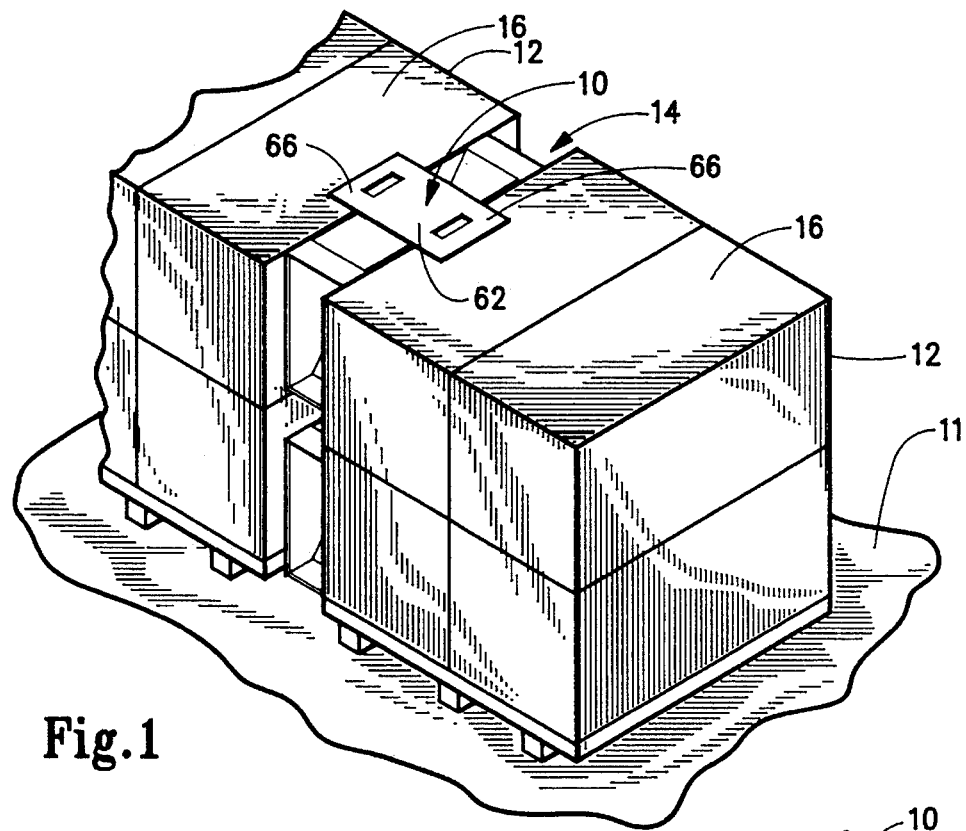
FIG. 1 is a perspective view of a pair of void filling devices according to two exemplary embodiments of the present invention shown interposed between adjacent pallets of cargo.

In order to illustrate how all of the embodiments of the present invention are used to support cargo against shifting, two exemplary embodiments are depicted in FIG. 1. A first void filling device 10 and a second void filling device 310 are each shown interposed between adjacent palletized cargo 12 in an open space 14 therebetween. Cargo 12 rests on a container support surface or floor 11, and cargo 12 has upper horizontal cargo surfaces 16 opposite floor 11. Void filling device 10 is shown suspended in open region 14 and is supported in an interposed relation between cargo loads 12 by the horizontal cargo surfaces 16, thereof. Void filling device 310, on the other hand, rests directly on floor 11. It should be appreciated that void filling devices 10, 310 are illustrative of the operational use of all the embodiments described herein.

Void filling device 10 is best shown in FIGS. 2–8. With reference to these figures, it may be seen that void filling device 10 has a main body portion formed by a pair of side panels 20 which are rectangular in shape and which each have a first longitudinal edge 22 and a second longitudinal edge 24 as well as opposite end edges 26 and 28. Each of side panels 20 is constructed of a pair of side panel portions 32 and 34 which fold with respect to one another about a longitudinal axis defined by score line 30. While it should be appreciated that each side panel 20 could be constructed of more than two longitudinally extending panel portions, only two such panel portions are needed to accomplish the necessary folding and are thus shown in the exemplary embodiment in these figures. Thus, side panels 20 are bi-fold panels which are symmetric about fold line 30.

First base panels 40 are hingedly secured to extend between the first side edges 22 of side panels 20 and are spaced-apart from one another to be located proximately to the opposite ends of void filling device 10. Base panels 40 have inner transverse edges 42 and outer transverse edges 44 with edges 42 and 44 being parallel to one another. Thus, first base panels 40 are also rectangular in construction. As noted, first base panels 40 are spaced-apart from one another so that an open region 46 is located between inner transverse edges 42 of base panels 40.

Similarly, second base panels 50 extend transversely between second side edges 24 of side panels 20 and are spaced-apart from one another at opposite ends of void filling device 10. Base panels 50 are hingedly secured to side panels 20 at edges 24 and are generally rectangular in configuration having transverse inner edges 52 and transverse outer edges 54. Accordingly, second base panels 50 are spaced-apart from one another about open region 56 located between inner transverse edges 52 thereof.

It may further be seen, then, that a first end for void filling device 10 is defined by edges 26 of side panels 20 along with outer transverse edges 44 and 54, respectively, of first opposed ones of first and second base panels 40 and 50 with these edges being co-planar with one another. Likewise, a second end for void filling device 10 is defined by end edges 28 of side panels 20 along with outer transverse edges 44 and 54 of a second set of opposed first and second base panels 40, 50 with these edges again being co-planar with one another.

Figure 2:
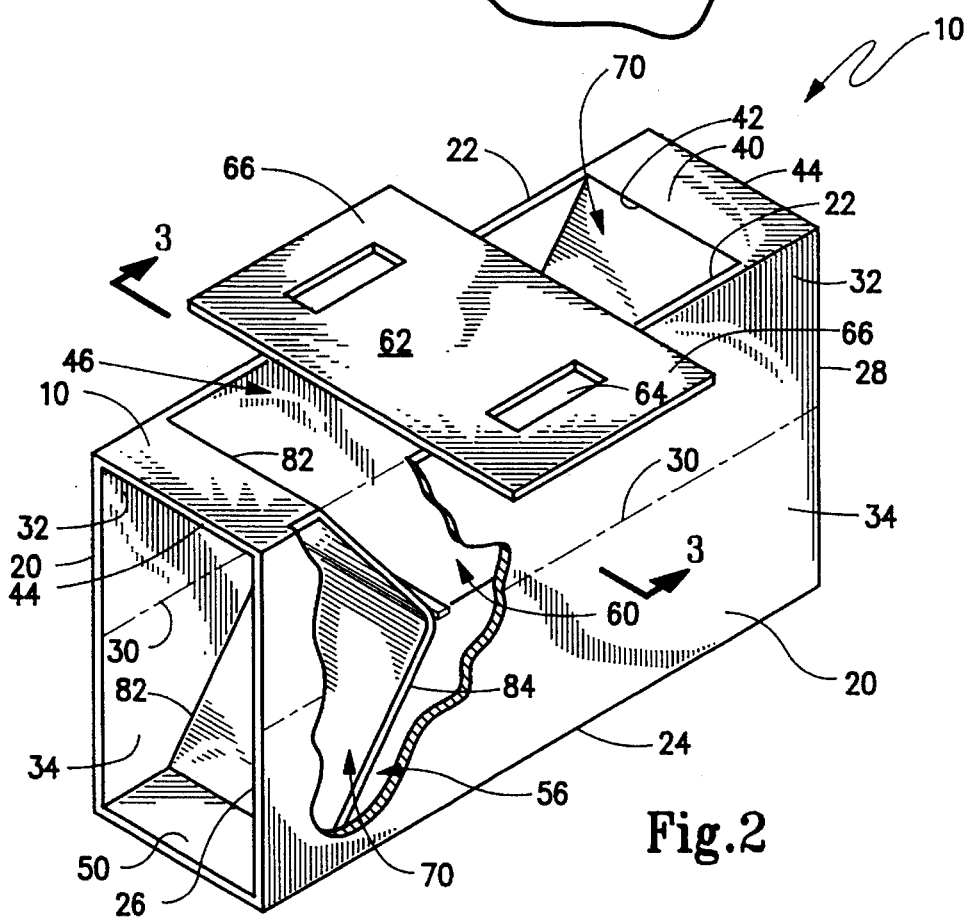
FIG. 2 is a perspective view of a first exemplary void filling device shown in FIG. 1 and made according to the present invention.

As may be seen with reference to FIG. 2, which shows void filling device 10 in an erect state, a pair of beam structures 70 are oriented in the interior 60 defined by spaced-apart sidewalls. The construction of each beam structure 70 is best shown in FIGS. 2, 4, 6 and 7 where it may be seen that each of beam structures 70 is formed by a pair of beam panels 72 and 74 which are hingedly attached to one another along a vertex 80 located interiorly of void filling device 10. Each of beam structures 70 extend between a set of opposed first and second base panels 40, 50 and are hingedly connected to respective inner transverse edges 42 and 52 thereof. While it should again be understood that more than two panels may be used to form each of beam structures 70, in this exemplary embodiment each of beam structures 70 is of bi-fold construction having two symmetric beam panels 72, 74 which are connected to one another at vertex 80 by means of flange portions 76 and 78, respectively. In the erect state, shown in FIGS. 2, 3 and 6, beam structures 70 have opposite edges 82 and 84 which abut side panels 20 to support side panels 20 against transverse compression forces. To this end, in the erect state, beam panels 72 and 74 are oriented at an angle of less than 180° with respect to one another to create a beam section, and it is preferred that this angle be in a range of 75° to 115°. Thus, it should be appreciated that beam panels 72 and 74 inwardly converge from their respective base panels 40, 50 in a direction towards the interior 60 of void filling device 10.

The structure of void filling device 10 is completed with the addition of optional hanger panel 62 which may best be seen in FIGS. 2–4 but is also shown in FIG. 1 suspending void filling device 10 from surfaces 16. Hanger panel 62 is rectangular in shape and extends transversely between side panels 20 and is secured thereto by means of tabs 64 which are cut out of the main body of hanger panel 62. Outwardly projecting wing portions 66 are then located outboard of tabs 64 so that they may rest on support surfaces, such as surfaces 16. Tabs 64 may be secured alongside side panels 20, for example, alongside side panel portions 32 thereof, either interiorly or exteriorly of void filling device 10 and secured thereto by means of adhesive, stapling, etc.

Figure 7:
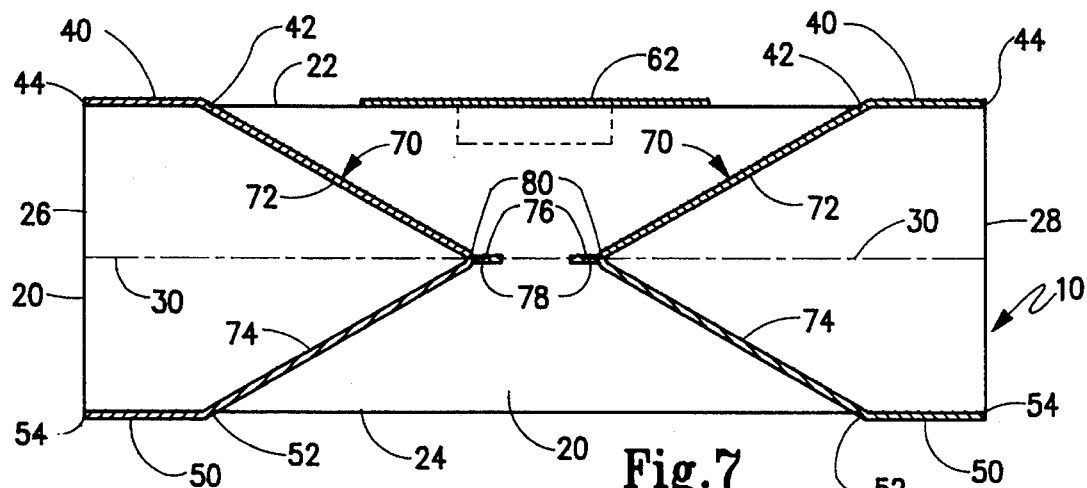
FIG. 7 is a cross-sectional view taken about lines 7—7 of FIG. 4 showing the void filling device in an intermediate state.
Figure 8:
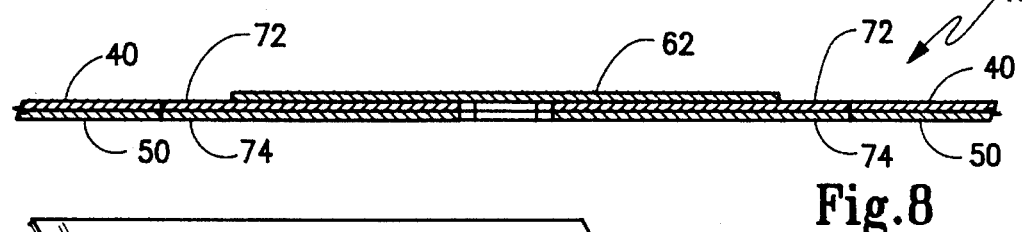
FIG. 8 is a longitudinal cross-sectional view taken about lines 8—8 of FIG. 5 showing the void filling device in a collapsed state.
Figure 9:
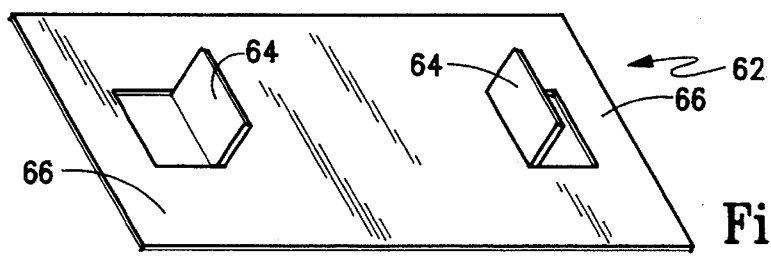
FIG. 9 is a bottom perspective view of the optional hanger panel which may be attached to the void filler devices of the present invention.

The expansion and collapse of void filling device 10 between the erect state and the flattened state is best shown in FIGS. 3–8. FIGS. 3 and 6 show void filling device 10 in the erect state while FIGS. 5 and 8 show void filling device 10 in the flattened state. FIGS. 4 and 7 show void filling device 10 in an intermediate state between the flattened and erect states. Here, it may be appreciated that, as void filling device 10 moves from the erect state toward the flattened state, side panel portions 32 and 34 begin to fold about scoreline 30 and thus bow outwardly as shown in FIGS. 4 and 7. This causes base panels 40 and 50 to move from a space-apart configuration closer toward one another. Since beam panels 72 and 74 are hingedly connected to base panels 40 and 50, they simultaneously undergo a folding movement reducing the angle of orientation therebetween. Accordingly, they begin to move inwardly toward one another, as is best shown in FIG. 7, in the intermediate state. The continued folding of void filling device 10 moves each set of base panels 40, 50 into abutting relationship with one another and, correspondingly, side panel portions 32 and 34 into an abutting relationship with one another. Correspondingly, beam panels 72 and 74 move into abutting relationship and are nested in open regions 46 and 56 respectively between first base panels 40 and second base panels 50. Thus, void filling device 10 may be folded into a substantially flattened configuration as shown in FIGS. 5 and 8.

Figure 10:
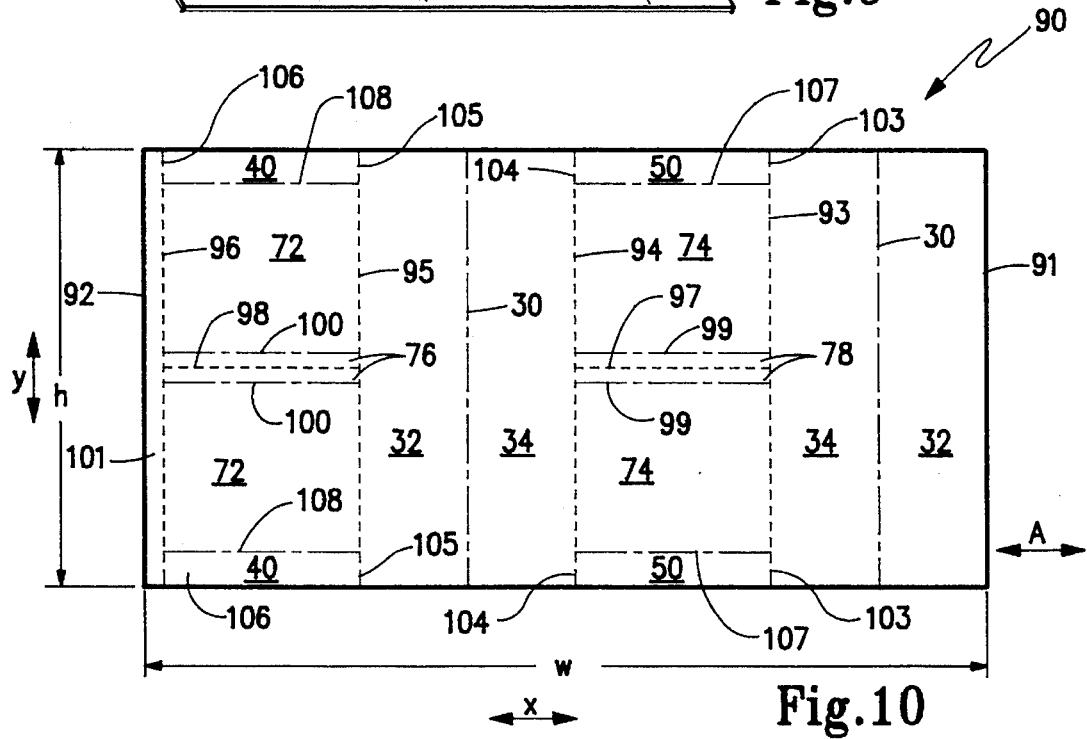
FIG. 10 is a top plan view of a production panel used to produce the void filling device shown in FIGS. 1–8.
Figure 11:
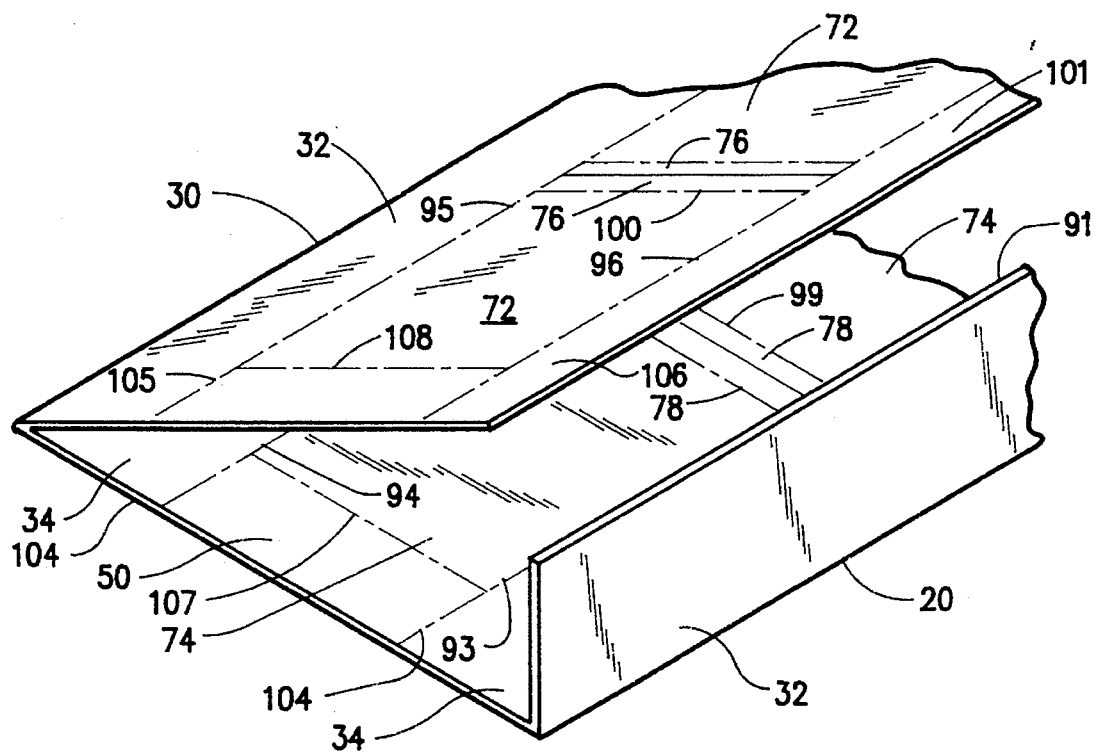
FIG. 11 is a perspective view of a portion of the production panel shown in FIG. 10, and being folded to produce the void filling device of FIGS. 2–8.
Figure 12:
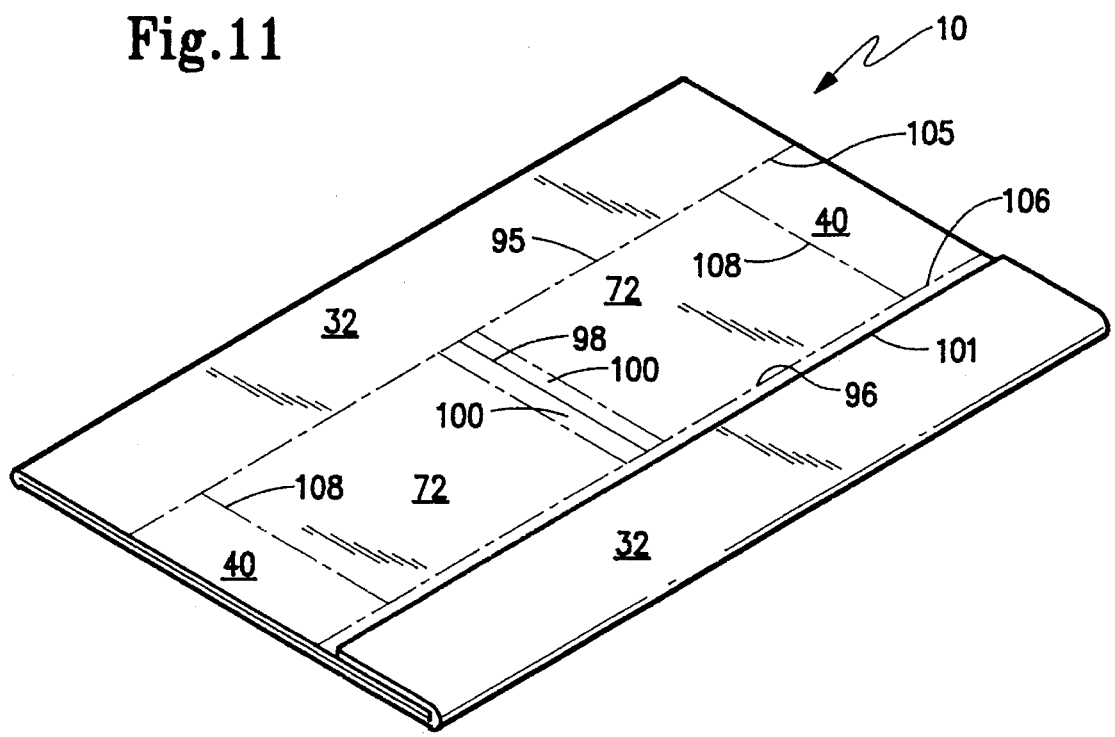
FIG. 12 is a perspective view of the production panel shown in FIG. 10 in the completely folded state which corresponds to the collapsed state for the void filling device.

The method of manufacture of void filling device 10 may best be seen in reference to FIGS. 10–12 where it may be appreciated that void filling device 10 (with hanger panel 62 omitted) may be constructed using a single unitary sheet of material, such as construction panel 90 shown in FIG. 10. While various construction materials may be employed, such as cardboard, fibre board, plastic, etc., it is preferred that construction panel 90 be a unitary sheet of corrugated cardboard having a width "w" in the direction of the x-axis and a height "h" in the direction of the y-axis. Furthermore, panel 90 preferably has corrugations running in the direction of arrow A (parallel to the x-axis) so that beam structures 70 will have their greatest strength. With reference to FIG. 10, construction panel 90 is simultaneously cut and scored along forming lines, discussed below although it should be appreciated that these operations do not need to occur simultaneously. More specifically, longitudinal scorelines 30 are formed parallel to edges 91 and 92 of construction panel 90 while cut lines 93, 94, 95 and 96 are cut parallel to scorelines 30 but do not extend completely across panel 90 in direction "y". Cut line 97 extends perpendicularly to cut lines 93, 94 medially thereof and interconnects lines 93 and 94 so that lines 93, 94 and 97 form an H-shaped cut to create beam panels 74 for beam structure 70. Similarly, cut 98 extends perpendicularly of cuts 95, 96 medially thereof and interconnects cuts 95, 96 in an H-shaped pattern to form beam panels 72. Scorelines 99 and 100 respectively flank cut lines 97, 98 and are parallel thereto to form flanges 78 and 76, respectively, for beam panels 74 and 72. Scorelines 103 are extensions, respectively, of cut lines 93 and 94 so that, along with cut lines 93 and 94, scorelines 103 and 104 form the second side edges 24 of side panels 20 by creating, along with scorelines 30, side panel portions 34. Similarly, scorelines 105 and 106 are formed as extensions of cut lines 95, 96, respectively, to create first longitudinal edges 22 of side panels 20. Accordingly, a side panel portion 32 is formed between the centrally located scoreline 30 and cut line 95 while a narrow margin portion 101 is provided between cut line 96 and edge 92. The other side panel portion 32 is accordingly formed between edge 91 and the scoreline 30 located proximately thereto. Scorelines 107 extend perpendicularly to scorelines 103, 104 and interconnect scorelines 103, 104 at their point of intersection with cut lines 93 and 94. Scorelines 107 thus form the second base panels 50. Similarly, scorelines 108 extend between scorelines 105 and 106 at their intersections, respectively, with cut lines 95 and 96 in order to form first base panels 40.

Prior to folding construction panel 90, as is shown in FIGS. 11 and 12, adhesive is placed on flanges 76 and 78 as well as on margin 101. With reference to FIG. 11, it may be seen that panel 90 is folded about scorelines 30 so that each beam panel portion 72 is superimposed over a respective beam panel 74. Margin 101 is thus adhered to the side panel portion 32 located adjacent edge 91 and each flange 76 adheres to a respective flange 78. Scorelines 30 as well as scorelines 99, 100, 104, 105, 107 and 108 accordingly form the hinged interconnection among the respective panels. When the adhesive cures, void filling device 10, as now constructed by panel 90, may be expanded since the H-shaped cut lines allow beam structures 70, as formed by panels 72, 74, to separate from the main body structure defined by side panels 20 and base panels 40, 50.

While it is preferred to form the cut lines and scorelines simultaneously, as described above, it should be appreciated that it is within the scope of this invention to form the cut lines subsequent to the formation of scorelines 30. Accordingly, after forming scorelines 30, it would be possible to apply the adhesive in the regions to become flanges 76, 78 and margin 101 and then fold panel 90 into the flattened configuration shown in FIG. 12. Cut lines 93–98 could then be cut in a single operation to form the beam structures. Scorelines 103–108 could be formed either concurrently with the formation of scorelines 30 or concurrently with the formation of cut lines 93–98.

Figure 13:
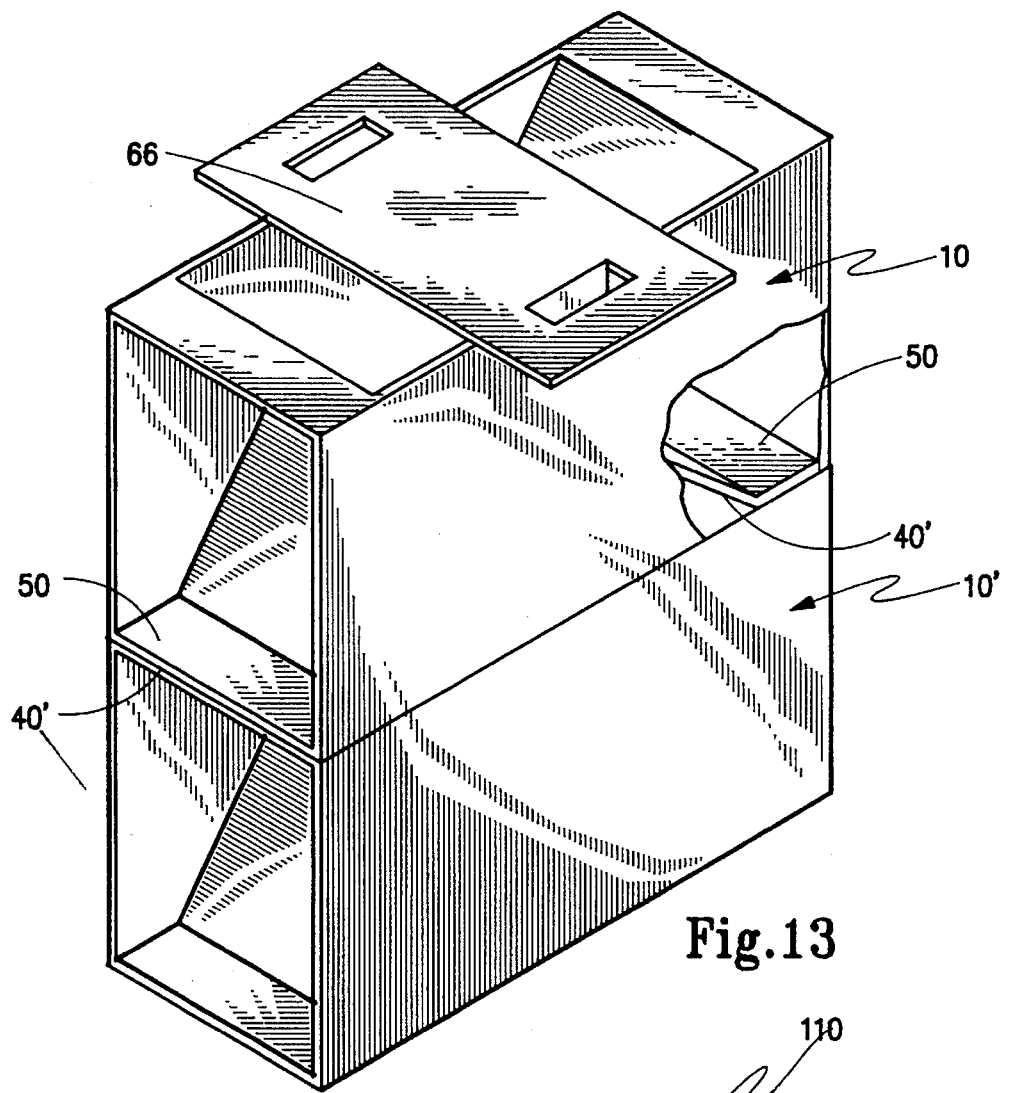
FIG. 13 is a perspective view, partially broken away, showing two of the void filling devices of FIGS. 2–8 attached together to provide a void filler of greater vertical dimension.

With reference to FIG. 13, it may be seen that the two void filling devices 10 may be affixed to one another to create a composite void filler of increased dimension. Here, the bottom of a first void filling device 10 is secured to the top of the void filling device 10'. More specifically, second base panels 50 of void filling device 10 are directly connected, by an adhesive, stapling, etc., to first base panels 40' of void filling device 10' so that the resulting void filler is twice the height of a single device. Optional hanger panel 66 is then secured to void filling device 10 so that the composite device may be suspended as shown in FIG. 1. It should be understood that with respect to this first embodiment, as well as the remaining embodiments, that multiple void filling devices may be secured to one another, either side-by-side or one on top of another, to create a larger composite void filler.

Figure 14:
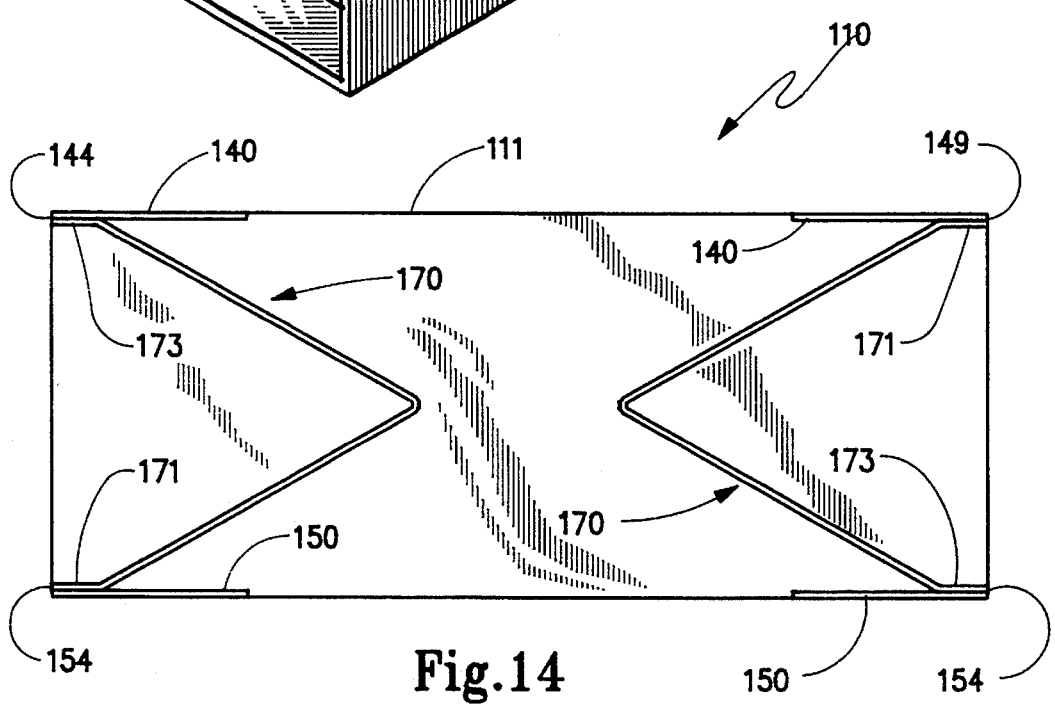
FIG. 14 is a longitudinal cross-section of an alternative embodiment of the void filling device shown in FIGS. 2–8 without the optional hanger panel and illustrating an alternative connection of the foldable beam structures.

A first alternative embodiment of the present invention is accordingly shown in FIG. 14. Here, void filling device 110 is constructed substantially identically as discussed with respect to void filling device 10 with the exception that beam structures 170 are connected to outer transverse edges 144 and 154, respectively, of first and second base panels 140, 150. While it is possible to construct void filling device 110 out of a unitary panel of construction material, some waste would be produced due to the need for an irregularly shaped construction panel. Alternatively, as is shown in FIG. 13, beam structures 170 may be formed independently of the main body 111 and adhered to base panels 140 and 150, respectively, by flanges 171, 173.

Figure 15:
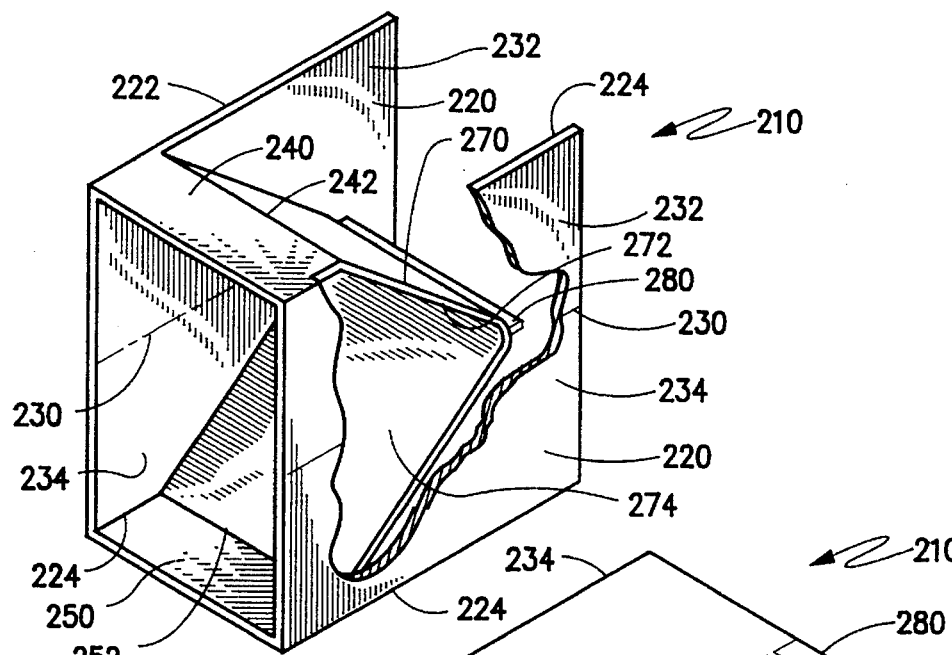
FIG. 15 is a perspective view, partially broken away, showing a third alternative embodiment of the present invention.
Figure 17:
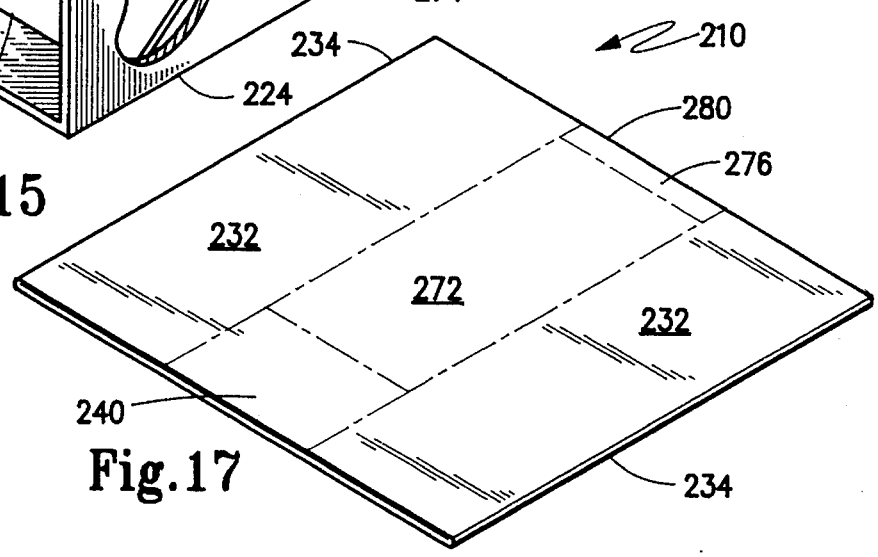
FIG. 17 is a perspective view of the production panel of FIG. 16 folded to produce the void filling device of FIG. 15 and corresponding to the collapsed state thereof.
Figure 16:
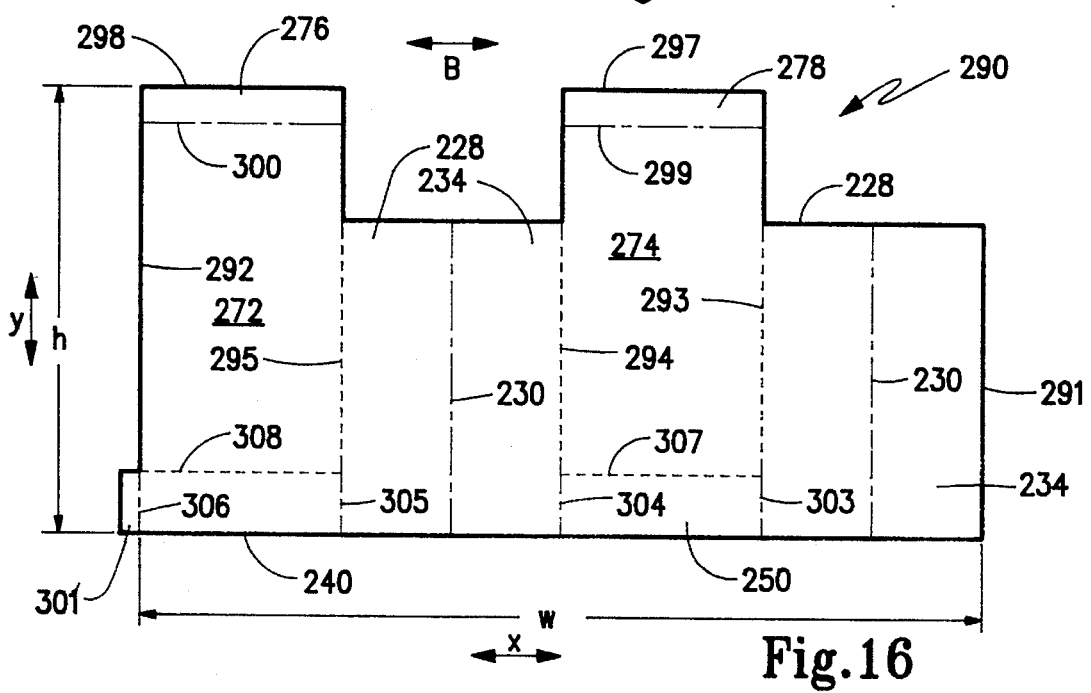
FIG. 16 is a top plan view of a production panel used to produce the void filling device of FIG. 15.

A second alternative exemplary embodiment is shown in FIG. 15 and 17 with the construction panel therefore being shown in FIG. 16. With reference to FIG. 15, it may be appreciated that void filling device 210 is substantially one-half of the void filling device 10 as shown in FIG. 2. Here, side panels 220 are formed by side panel portions 232 and 234 separated by scoreline 230. A single first base panel 240 extends transversely between longitudinal edges 222 of side panels 220 while a second base panel 250 extends transversely between second longitudinal edges 224 of side panels 220. Beam structure 270 is formed by beam panels 272 and 274 connected at vertex 280 and interconnect base panels 240 and 250 at the inner transverse edges 242 and 252 thereof.

In order to obtain sufficient beam strength, it is preferred that a construction panel such as construction panel 290 shown in FIG. 16, is used to create void filling device 210. In FIG. 16, it may be seen that an irregularly shaped panel 290 is a unitary panel preferably formed again of corrugated material having corrugations running in the direction of arrow B. In this embodiment, construction panel 290 is simultaneously cut and scored along forming lines in a manner similar to that with respect to construction panel 90, described above. Here, however, scorelines 230 are formed parallel to edges 291 and 292 while cut lines 293, 294 and 295 are cut parallel to scorelines 230 in the direction "y" but do not extend completely cross panel 290 for the height "h" thereof. Cut lines 293, 294 and 295 do, however, intersect side edges 228 so that beam panels 72 and 74 are cut out of construction panel 290. To this end, also, edges 297 and 298 are formed, respectively, from beam panels 74 and 72 and scorelines 299 and 300 respectively flank edges 297, 298 and are parallel thereto to form flanges 278 and 276 that are to be connected at vertex 280. Scorelines 303, 304 and 305 are respectively formed as extensions of cut lines 293, 294 and 295, to create side panel portions 234. Likewise, a scoreline 306 is formed as an extension of side edge 292 to form marginal tab 301. Scoreline 307 extends perpendicularly to scorelines 303 and 304 and interconnect these scorelines at their point of intersection with cut lines 293 and 294. Similarly, scoreline 308 extends between scorelines 305 and 306 at their intersection respectively with cut lines 295 and side edge 292 to form these panels 240.

Prior to folding construction panel 290, as is shown in FIG. 17, adhesive is placed on flanges 276 and 278 as well as on margin 301. When folded, then, flanges 278 and 276 adhere to one another to form vertex 280, and beam structure 270 is formed by panels 272 and 274. Margin 301 is secured alongside side panel f270 to create a body portion for void filling device 210. Thus, similarly to construction panel 90, construction panel 290 is folded along its width, at scorelines 303, 304, 305 and 306 so that the longitudinal length of void filling device 210 is formed by the height "h" of panel 290.

Figure 18:
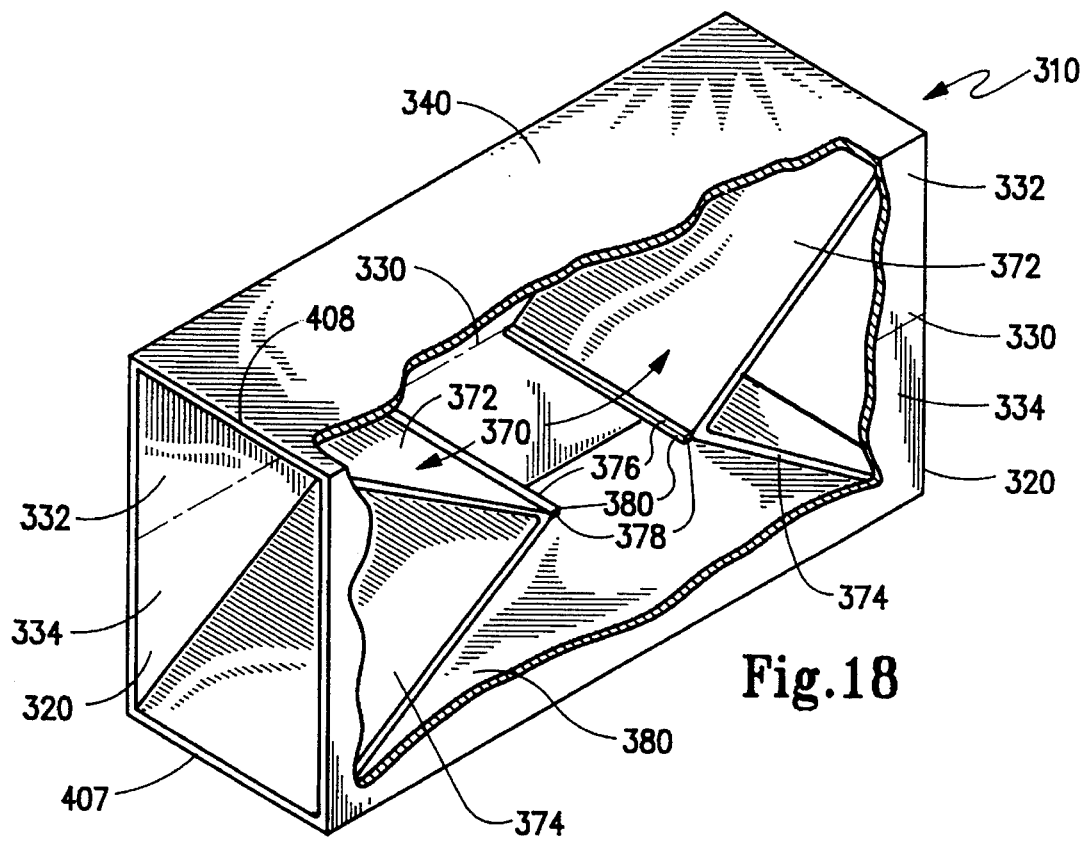
FIG. 18 is a perspective view, partially broken away, showing a fourth alternative embodiment of the present invention which is also shown in use in FIG. 1.
Figure 19:
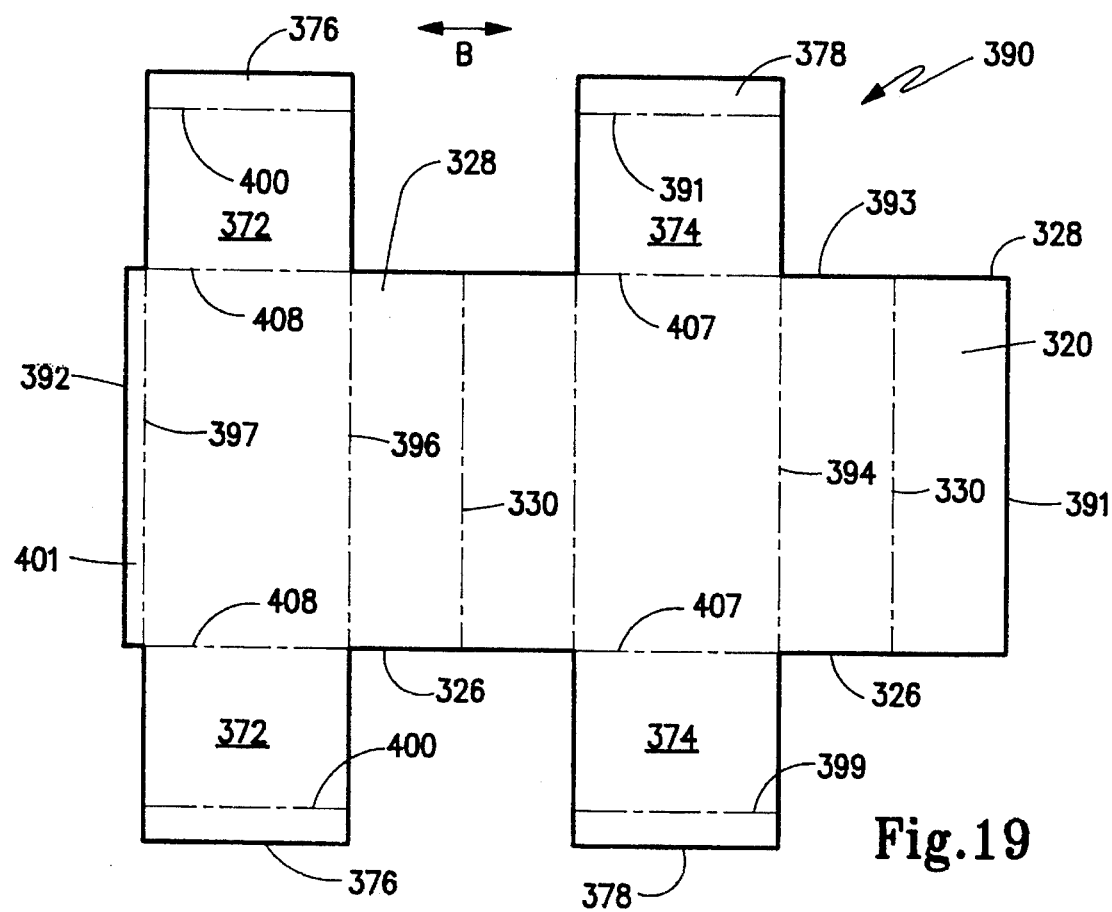
FIG. 19 is a top plan view of a production panel used to produce the void filling device of FIG. 18.

A final exemplary embodiment of the present invention is shown in FIG. 18, and the construction panel therefore is shown in FIG. 19. In FIG. 18, void filling device 310 has a pair of side panels 320 formed by side panel portions 332 and 334. A first base panel 340 extends a complete longitudinal length of void filling device 310 and a second base panel 350 likewise extends the complete length of void filling device 310 in opposed relation to panel 340. Thus, void filling device 310 is in the shape of a rectangular tube structure.

A pair of beam structures 370 are located on the interior of void filling device 310 and are each formed by a pair of beam panels 372 and 374 joined by flanges 376 and 378 at vertices 380. Beam panels 372 are formed as outward longitudinal extensions of base panel 340 while flanges 374 are formed as extensions of base panel 350 folded about scorelines 408 and 407, respectively, into the interior of void filling device 310. Beam panels 372 and 374 are again oriented at an angle of less than 180° with respect to one another and may fold about vertex 380 as void filling device 310 expands and contracts. To this end, also, side panels 320 fold and unfold due to the longitudinal scoreline 330 formed between side panel sections 332 and 334.

With reference to FIG. 19, it may be seen that void filling device 310 is formed out of unitary construction panel 390. Panel 390 is irregular in shape having beam panel sections 372 and 374 formed as extensions of a rectangular central panel portion. Void filing device 310 is formed by a plurality of scorelines 330 and 394–397 formed parallel to one another and parallel to edges 391 and 392 of central panel portion 393. Scorelines 407 extend perpendicularly between scorelines 394 and 395 as extensions of edges 326 and 328 of side panels 320 and, likewise, scorelines 408 extend perpendicularly to scorelines 396 and 397 as extensions of side edges 326 and 328. Scoreline 397 forms a margin 401 for connection to an opposite side panel 320 along edge 391 thereof.

For assembly, beam panels 372 and 374 are respectively folded along their scorelines 408 and 407 after which adhesive is applied to flanges 376 and 378 formed by scorelines 399 and 400. Adhesive is applied to margin 401 and construction panel 390 is folded about its width so that flanges 376 and 378 of opposed pair of beam panels 372, 374 adhere to one another. Margin 401 is adhered along edge 391 to create the tubular structure.

From the foregoing, it should be appreciated that the method of scoring and/or cutting a construction sheet, such as the construction sheets shown in FIGS. 10, 16 and 19, provides a method for forming a void filling device. Thus, the method according to the present invention contemplates all of the steps discussed with respect to the configuration and processing of construction sheets 90, 190 and 290. From this, it may be appreciated that the broad method according to the present invention is directed to the formation of a void filling device that has a pair of parallel folding side panels, at least two base panels extending between said side panels and in opposed relation to one another and at least two beam panels attached to one another to form a beam structure located interiorly of the two side panels.

The broad method, then, includes the step of providing a unitary sheet of construction material having parallel side edges spaced-apart from one another to define a width for this sheet. The broad method then includes the step of scoring the sheet along a plurality of spaced-apart longitudinal scorelines located parallel to the side edges to create the folding side panels. In one embodiment, the longitudinal scorelines are formed completely across the height "h" of the construction panel while, in other embodiments, the longitudinal scorelines do not all extend completely across the height of the construction sheet. In any event, the method includes the scoring of the construction sheet along transverse scorelines perpendicularly oriented between selected ones of the longitudinal scorelines to create the base panels. The beam panels are formed in one embodiment by folding extensions of the base panels inwardly along the scorelines which form the beam panels and in another embodiment by cutting the beam panels out of the body of the construction sheet by way of longitudinally extending parallel cut lines that are linear extensions of selected ones of the scorelines.

The construction sheet is then folding along selected ones of the scorelines by each of the beam panels opposes another beam panel and the side edges of the construction sheet are secured to one another whereby the side panels opposed one another and the base panels oppose one another. Portions of the beam panels are then secured together to form at least one beam structure interiorly of the side panels.

It is preferred that the steps of scoring and cutting the construction panel occur contemporaneously, that is, substantially at the same time in a common processing operation. This preferably occurs prior to folding the construction sheet. Alternatively, where the beam panels are cut from the construction sheet, the panel may first be folded after which the cut lines are made. Furthermore, it is preferred that the step of securing the beam panels together and the step of securing the side edges together occur contemporaneously.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

We claim:

1. A void filling device collapsible into a flattened state and expandable into an erect state and adapted to be interposed between spaced cargo when in the erect state to inhibit relative movement during transit, comprising:

(a) a pair of side panels each having longitudinally extending first and second side edges, said pair of side panels being spaced apart from one another to define an interior therebetween when said void-filling device is in the erect state, each of said side panels including side panel portions constructed to fold about a longitudinal axis between a folded state when said void-filling device is collapsed and an unfolded state when said void-filling device is erect;

(b) a first base panel hingedly secured to the first side edges of said side panels to extend transversely therebetween and a second base panel hingedly secured to the second side edges of said side panels to extend transversely therebetween such that said first and second base panels move toward one another when said side panels are folded into the folded state and move away from one another when said side panels are unfolded into the unfolded state whereby said first and second base panels are closely spaced with one another when said void-filling device is collapsed and spaced-apart from one another when said void-filling device is erect; and (c) a foldable beam structure located in the interior between said side panels and oriented transversely thereto, said beam structure hingedly connected to said first and second base panels to extend therebetween, said beam structure including first and second beam panels foldable with respect to one another about a transverse axis so that, as said first and second base panels move toward and away from one another, said first and second beam panels fold to allow said void-filling device to collapse and expand, said beam structure operative when said void-filling device is in the erect state to support said side panels against transverse compression forces, said void filling device being integrally formed as a single-piece construction.

2. A void-filling device according to claim 1 wherein said side panels are oriented substantially parallel to one another when said void-filling device is in the erect state.

3. A void-filling device according to claim 1 wherein each of said side panels consists of a pair of said side panel portions that are symmetric about a respective said longitudinal axis.

4. A void-filling device according to claim 1 wherein said beam panels are oriented at an angle of less than 180 degrees with respect to one another when said void-filling device is in the erect state.

5. A void-filling device according to claim 1 wherein each of said first and second base panels has parallel first and second transverse edges, said beam structure respectively connected to said first and second base panels along a selected one of the first and second transverse edges.

6. A void-filling device according to claim 1 including another first base panel so as to include a plurality of first base panels each hingedly connected to the first side edges of said side panels to extend transversely therebetween and spaced-apart from one another to be located proximate to opposite ends of said void-filling device and another second base panel so as to include a plurality of second base panels each hingedly connected to the second side edges of said side panels to extend transversely therebetween and spaced-apart from one another to be located proximate to opposite ends of said void-filling device, and including another beam structure so as to include a plurality of beam structures so that there is a first beam structure associated with the first and second based panels at a first end of said void-filling device and a second beam structure associated with the first and second base panels at a second end of said void-filling device.

7. A void-filling device according to claim 6 wherein the beam panels of each of said beam structures converge at a vertex and are oriented at angle of less than 180 degrees with respect to one another when said void-filling device is in the erect state.

8. A void-filling device according to claim 7 wherein said beam panels of each beam structure converge in a direction toward the interior of said void-filling device.

9. A void-filling device according to claim 1 wherein the material from which said panels are constructed comprises corrugated cardboard.

10. A void-filling device according to claim 1 wherein said first and second base panels extend completely along said first and second side edges, respectively, of said pair of side panels and terminate at outer transverse edges.

11. A void-filling device according to claim 10 including a second beam structure, each of said beam structures interconnecting the outer transverse edges of said first and second base panels, respectively, at each opposite end thereof.

12. A void-filling device according to claim 1 including a hanger panel secured between said side panels, said hanger panel having outwardly projecting wing portions operative to support said void-filling device on spaced cargo whereby said void-filling may be suspended therebetween.

13. A void-filling device collapsible into a flattened state and expandable into an erect state and adapted to be interposed between spaced cargo when in the erect state to inhibit relative movement during transit, comprising:

(a) a pair of bi-fold side panels each having longitudinally extending first and second side edges and each formed by a pair of longitudinally extending side panel portions constructed to fold about a longitudinal fold line located between the first and second side edges thereof so that each of said side panels can fold between a folded state when said void-filling device is collapsed and an unfolded state when said void-filling device is erect, said pair of side panels being spaced apart from one another to define an interior therebetween when said void-filling device is in the erect state;

(b) a pair of first base panels hingedly secured to the first side edges of said side panels to extend transversely therebetween and spaced-apart from one another and a pair of second base panels hingedly secured to the second side edges of said side panels to extend transversely therebetween and spaced-apart from one another, each one of said second base panels being in an opposed relation to a respective one of said first base panels such that opposed ones of said first and second base panels move toward and away from one another when said side panel portions each fold about its respective longitudinal fold line, the opposed ones of said first and second base panels being closely spaced with respect to one another when said void-filling device is collapsed and spaced-apart from one another when said void-filling device is erect; and (c) a pair of foldable beam structures each located in the interior between said side panels and oriented transversely thereto, each one of said beam structures being hingedly connected between opposed ones of said first and second base panels and each one of said beam structures including first and second beam panels foldable with respect to one another about a transverse axis so that, as the opposed ones of said first and second base panels move toward and away from one another, said first and second beam panels fold to allow said void-filling device to collapse into the flattened state and expand into the erect state, whereby when in the flattened state said beam structures do not overlap, each of said beam structures operative when said void-filling device is in the erect state to support said side panels against transverse compression forces.

14. A void-filling device according to claim 13 wherein said side panel portions are symmetric about a respective said longitudinal fold line.

15. A void-filling device according to claim 13 wherein said beam panels are oriented at an angle of less than 180 degrees with respect to one another when said void-filling device is in the erect state.

16. A void-filling device according to claim 13 wherein each of said first and second base panels has parallel inner and outer transverse edges, each said beam structure connected between the respective opposed ones of said first and second base panels at the outer transverse edges thereof.

17. A void-filling device according to claim 13 wherein said beam panels of each beam structure converge at a vertex in a direction toward the interior of said void-filling device.

18. A void-filling device according to claim 13 including a support panel secured between said side panels, said support panel having outwardly projecting wing portions operative to support said void-filling device on spaced cargo whereby said void-filling may be suspended therebetween.

19. A void-filling device according to claim 13 wherein said side panels, said base panels and said beam structures are formed of a unitary piece of panel material.

20. A void-filling device according to claim 19 wherein said panel material is corrugated cardboard.

21. A void-filling device collapsible into a flattened state and expandable into an erect state and adapted to be interposed between spaced cargo when in the erect state to inhibit relative movement during transit, comprising:

(a) a pair of bi-fold side panels each having longitudinally extending first and second side edges and each formed by a pair of longitudinally extending side panel portions constructed to fold about a longitudinal fold line located between the first and second side edges thereof so that each of said side panels can fold between a folded state when said void-filling device is collapsed and an unfolded state when said void-filling device is erect, said pair of side panels being spaced apart from one another to define an interior therebetween when said void-filling device is in the erect state;

(b) a pair of first base panels hingedly secured to the first side edges of said side panels to extend transversely therebetween and spaced-apart from one another and a pair of second base panels hingedly secured to the second side edges of said side panels to extend transversely therebetween and spaced-apart from one another with each of said first and second base panels having parallel inner and outer transverse edges, each one of said second base panels being in an opposed relation to a respective one of said first base panels such that opposed ones of said first and second base panels move toward and away from one another when said side panel portions each fold about its respective longitudinal fold line, the opposed ones of said first and second base panels being closely spaced with respect to one another when said void-filling device is collapsed and spaced-apart from one another when said void-filling device is erect; and (c) a pair of foldable beam structures each located in the interior between said side panels and oriented transversely thereto, each one of said beam structures being hingedly connected between opposed ones of said first and second base panels at the inner transverse edges thereof, each one of said beam structures including first and second beam panels foldable with respect to one another about a transverse axis so that, as the opposed ones of said first and second base panels move toward and away from one another, said first and second beam panels fold to allow said void-filling device to collapse and expand, each of said beam structures operative when said void-filling device is in the erect state to support said side panels against transverse compression forces.

* * * * *